United States Patent [19]

Travers

[11] Patent Number: 5,171,390
[45] Date of Patent: Dec. 15, 1992

[54] PLANT BASE COVER

[76] Inventor: Robert J. Travers, 20391 Birch St., Santa Ana Heights, Calif. 92707

[21] Appl. No.: 522,216

[22] Filed: May 11, 1990

Related U.S. Application Data

[63] Continuation-in-part of Ser. No. 439,833, Nov. 20, 1989, abandoned.

[51] Int. Cl.⁵ .............................................. B32B 31/12
[52] U.S. Cl. ..................................... 156/212; 156/242; 156/245; 47/41.01; 47/41.1; 47/66; 47/67; 47/72; 47/78
[58] Field of Search ................. 156/91, 148, 242, 245, 156/276, 278, 279, 212, 85, 86; 47/41.01, 41.1, 66, 67, 72, 78, 84; 264/247, 257

[56] References Cited

U.S. PATENT DOCUMENTS

| | | | |
|---|---|---|---|
| 101,907 | 4/1870 | O'Neil | 47/67 |
| 1,468,525 | 9/1923 | Strauss | 156/212 |
| 1,532,325 | 4/1925 | Lee | 156/91 |
| 1,624,504 | 4/1927 | Pfarr | 47/67 |
| 2,143,461 | 1/1939 | Waring | 47/9 |
| 2,474,375 | 6/1949 | Shearer et al. | 156/86 |
| 2,766,453 | 10/1956 | Frieder et al. | 156/148 |
| 2,827,217 | 3/1958 | Clement | 47/72 |
| 2,949,698 | 8/1960 | Downey | 47/9 |
| 2,976,646 | 3/1961 | Hansen | 47/56 |
| 3,314,194 | 4/1967 | Halleck | 47/34.11 |
| 3,315,408 | 4/1967 | Fisher | 47/9 |
| 3,479,666 | 11/1969 | Webb | 264/257 |
| 3,704,544 | 12/1972 | Spanel et al. | 47/9 |
| 3,818,633 | 6/1974 | Sable | 47/67 |
| 3,891,423 | 6/1975 | Stanley et al. | 71/86 |
| 4,062,145 | 12/1977 | Gidge | 47/9 |
| 4,090,325 | 5/1978 | Mushin et al. | 47/9 |
| 4,190,981 | 3/1980 | Muldner | 47/56 |
| 4,199,388 | 4/1980 | Tracy et al. | 156/245 |
| 4,242,835 | 1/1981 | Mondragon Sorribes | 47/84 |
| 4,414,776 | 11/1988 | Ball | 47/56 |
| 4,741,124 | 5/1988 | Sasm | 47/67 |
| 5,018,300 | 5/1991 | Chiu et al. | 47/67 |

FOREIGN PATENT DOCUMENTS

| | | | |
|---|---|---|---|
| 2567068 | 1/1986 | France | 47/72 |
| 111526 | 8/1980 | Japan . | |

*Primary Examiner*—Caleb Weston
*Attorney, Agent, or Firm*—Stetina and Brunda

[57] ABSTRACT

A plant base cover and plant basket liner, each including a layer of an absorbent material adhesively bound to a netting that is preferably formed of a durable material such as nylon. The plant base cover includes a passage for admitting the base of a plant therethrough and a cut extending from an edge of the plant base cover to the edge of the passage to facilitate placement of the plant base cover around a plant. The plant basket liner is specifically sized and configured to be placed within conventionally-known plant baskets and is adapted to maintain a quantity of soil therein. The process of fabricating both the plant base cover and plant basket liner includes the steps of forming a layer of the insulating and absorbent material, securing a netting over the layer, and spraying the layer and the netting to adhesively bind them together.

4 Claims, 2 Drawing Sheets

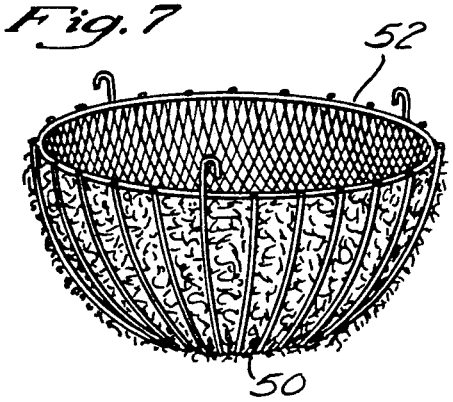
Fig. 7
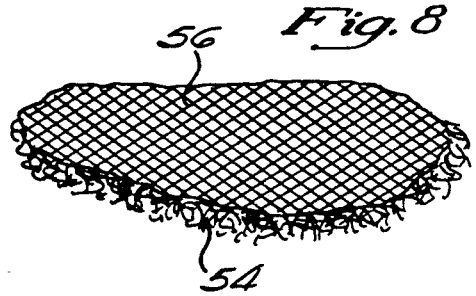
Fig. 8
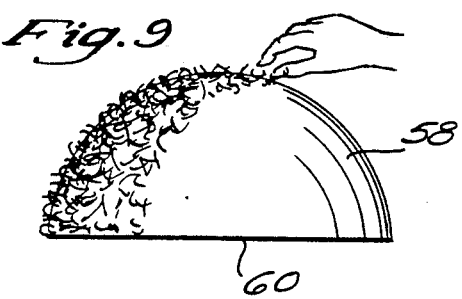
Fig. 9
Fig. 10
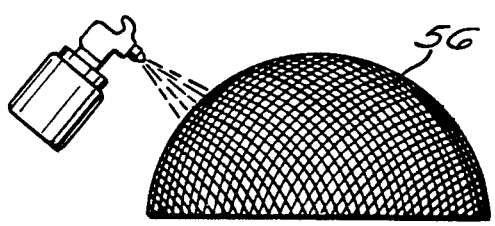
Fig. 12
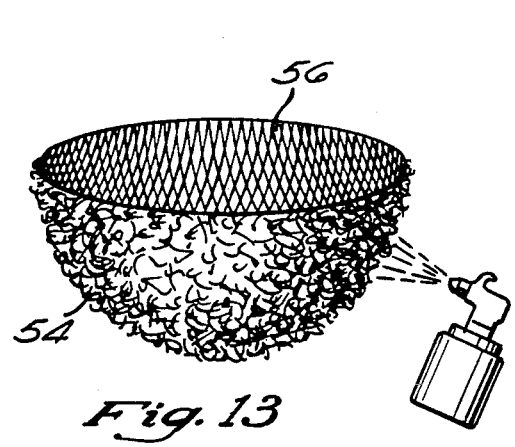
Fig. 11
Fig. 13

PLANT BASE COVER

This is a continuation-in-part of copending application Ser. No. 07/439,833 filed on Nov. 20, 1989 now abandoned.

FIELD OF THE INVENTION

This invention is generally related to apparatus and methods for horticulture and particularly to apparatus and methods for covering the soil surface around the base of a potted plant and lining the interior of a hanging plant basket.

BACKGROUND OF THE INVENTION

Having potted plants and hanging plants in homes, offices, stores and commercial environments has become a prevalent practice for aesthetic, decorative purposes, oxygen generation and for the beneficial psychological effects many people experience in the presence of such plants. The beneficial effects of potted and hanging plants have given rise to businesses which provide plant maintenance services for tending, rotating and replacing such plants.

A plant used for such purposes is typically grown in a suitable potting soil retained within an inexpensive inner container such as a plastic pot or metal can for easy portability. To insure proper aesthetics, the inner container is typically positioned within a decorative container permanently maintained or hung in a desired location within the building. With regard to potted plants, so as to conceal the inner container within the decorative container, and camouflage the potting soil about the base of the plant, a material such as Spanish moss or sphagnum moss is manually spread and positioned to extend throughout the interior of the decorative container. Rotating plants between offices or replacing a plant, therefore, involves manually removing the moss, removing the inner container from the decorative container and manually replacing and spreading the moss. This procedure, which is time consuming in itself, usually causes some moss to fall onto the floor adjacent the decorative pot. The floor must subsequently be cleaned, thereby requiring additional personal time and reducing the efficiency of the plant maintenance service.

With regard to hanging plant baskets, generally these baskets are configured such that they must be lined with a decorative material so as to enhance the aesthetic value of the basket as well as aid in maintaining a quantity of soil therein. Conventionally known methods for lining such baskets basically involve manually lumping quantities of decorative material along the interior surfaces of the basket and placing a quantity of soil therein. As can be appreciated, this process often proves to be both messy and time consuming. Moreover, after using this lining technique, often times additional material must be stuffed into exterior portions of the basket when areas of the interior lining are discovered to be of insufficient thickness to maintain the soil within the basket. Thus, there exists a need in the art for a decorative, prefabricated hanging plant basket liner which is cost effective, easy to install, and adequately maintains soil within the basket.

SUMMARY OF THE INVENTION

The present invention provides a plant base cover and a hanging plant basket liner, and methods of fabrication thereof which overcomes and alleviates the deficiencies in the prior art.

In the first embodiment of the present invention the plant base cover covers the unsightly inner container and soil of the plant and permits quick, clean removal from the plant, eliminating the possibility of having moss fall out of the pot.

In the second embodiment of the present invention, the basket liner is adapted to quickly and easily line the interior portion of hanging plant basket so as to decorate and enhance the exterior features of the basket while maintaining a quantity of soil therein, thus eliminating the need to line the basket manually in a messy, time consuming manner.

The plant base cover and basket liner each include a layer of a decorative material such as Spanish moss or sphagnum moss adhesively bound to a netting, which is preferably formed of a durable material, such as nylon or other similar material.

Fabrication of the plant base cover of the invention includes the steps of forming a layer of the absorbent, insulating material on a suitable surface, such as a table. The netting material is placed over the layer and securely bound to the table; and then a suitable adhesive is applied to the layer and the netting by any convenient means, such as spraying. After the adhesive has dried to adhere the netting to the layer, the resulting structure may be cut into desired forms, such as circles, rectangles, etc., or rolled into compact shapes for shipment and distribution.

The invention is easy to apply to a potted plant to cover the upper surface of the soil or potting material and the upper portion of the inner pot. The plant base cover of the invention remains intact for use for an extended time period. It is convenient to apply water to the plant by pouring water onto the surface of the plant base cover. The water then passes through the plant base cover into the soil for supply to the plant's roots.

Fabrication of the basket liner of the present invention includes the steps of forming a layer of the absorbent, decorative material on the outer surface of a preconstructed form wherein such form is taken from the interior of the basket with which the liner is to be utilized. A suitable adhesive is applied to the layer by any convenient means, such as spraying. The netting material is placed over the layer of decorative material and securely bound thereto, and then a second spraying of adhesive is applied to the layer of decorative material and the netting. The resulting structure is removed from the form and inverted such that the decorative material defines the outer surface of the liner and the netting material defines the interior portion of the liner. The adhesive is then dried and a colorant applied to the decorative material. The basket liner, like the base cover, is also constructed to remain intact for an extended period of time.

BRIEF DESCRIPTION OF THE DRAWINGS

FIG. 7 is a perspective view showing a plant liner according to the present invention disposed within the interior of a hanging plant basket;

FIG. 8 is a perspective view of a portion of the plant liner shown in FIG. 1 illustrating both the decorative material and netting layers;

FIG. 9 is a perspective view illustrating the application of a layer of decorative material to the semispherical exterior surface of a form;

FIG. 10 is a perspective view illustrating the step of spraying the layer of decorative material with an adhesive;

FIG. 11 is a perspective view illustrating the application of a layer of netting over the layer of decorative material;

FIG. 12 is a perspective view illustrating the step of spraying the layer of netting and the layer of decorative material with an adhesive; and FIG. 13 is a perspective view illustrating the application of colorant to the layer of decorative material after the liner has been removed from the form, inverted and dried.

DETAILED DESCRIPTION OF THE PREFERRED EMBODIMENTS

Figure 1:
FIG. 1 is a perspective view showing a plant base cover according to the invention covering the soil surface around a potted plant.

Referring to FIG. 1, in the first embodiment of the present invention, there is shown a potted plant 10 having its roots growing within the confines of an inner pot 12, which may conveniently be formed of any ceramic, plastic, metal or wooden material but typically comprises an inexpensive dispensable material such as plastic or tin. The pot 12 is filled to a desired level with a potting soil 14. The inner pot 12 is positioned within an outer pot 15, which is preferably designed to have an aesthetically pleasing appearance. The plant 10 has a base 16 that projects out of the potting soil 14. A plant base cover 18 is positioned around the base 16 of the plant 10 to cover the surface of the potting soil 14 and the inner pot 12 while closely surrounding the base 16.

Figure 2:
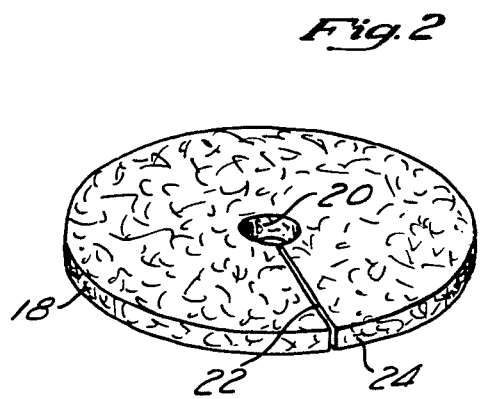
FIG. 2 is a perspective view of the plant base cover of FIG. 1.

Referring to FIG. 2, the plant base cover 18 is shown by way of example only, to have a generally disc-like configuration preferably sized to have a standardized pot diameter such as 6, 8, 10 or 12 inches with a circular portion having been removed therefrom to leave a generally circular passage 20. A generally radial cut 22 extends from the edge of the passage 20 to the outer edge 24 of the plant base cover 18. The plant base 16 passes through the passage 20. The plant base cover 18 is flexible so that it may be temporarily distorted along the radial cut 22 and the passage 20 for fixation around the base 16. After the plant base cover 18 is positioned so that the passage 20 is around the plant base 16, the edges of the cut 22 may be juxtaposed to provide essentially complete covering of the surface of the potting soil 14. The plant base cover may easily be cut with a knife, scissors or the like to enlarge the passage 20 if necessary to accommodate the plant base 16 therein. The outer edges 24 of the plant base cover 18 may also be trimmed to fit with a particular pot 12. It is contemplated that the plant base cover 18 and passage 20 will be provided in a variety of sizes to minimize trimming and to enhance the convenience of use of the device.

Figure 3:
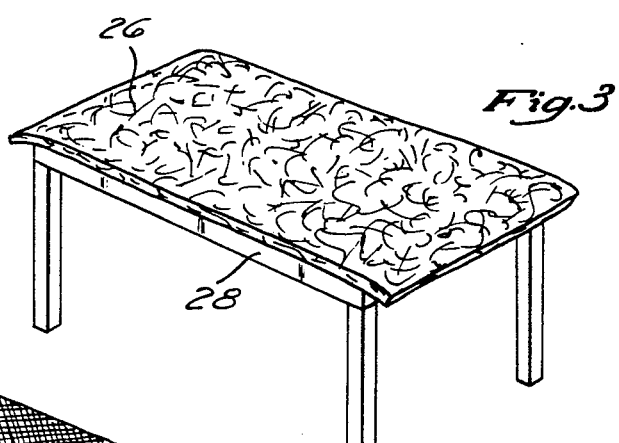
FIG. 3 is a perspective view illustrating a layer of moss on a table.
Figure 4:
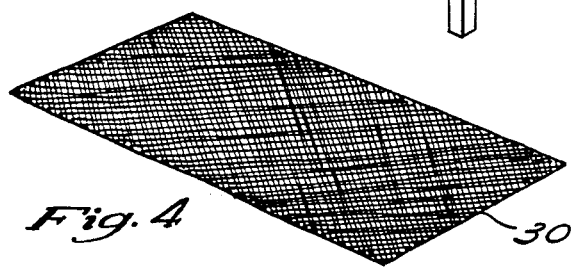
FIG. 4 is a perspective view illustrating netting for application to the layer of moss of FIG. 3.

Referring to FIG. 3, fabrication of the plant base cover 16 preferably includes the step of forming a layer 26 of a suitable mat-like covering material such as sphagnum moss or Spanish moss on a flat surface such as the top of a table 28. The layer 26 is preferably 2"–3" thick and is spread relatively uniformly on the table 28. A piece of flexible netting 30, which is preferably a diagonal mesh, as shown in FIG. 4 is spread over the layer 28, subsequently moderately stretched taut to slightly compress the moss between the table and netting and then tightly secured on all sides to the table 26 to hold the moss down. The netting 30 is then rolled with a suitable rolling device, such as a rolling pin, a rotary paint applicator, or other similar device to engage the netting 30 into the layer 26.

After rolling, the netting 30 and layer 26 are preferably sprayed with a suitable adhesive to bond them together. It has been found that 3M Co. supplies adhesives identified as "90 Spray Adhesive" and 5034 Contact Cement" that are suitable bonding agents for this application. These adhesives are only exemplary of water insoluble adhesives that are satisfactory for bonding the netting 30 and the layer 26 and when dry or cured, are not toxic to plant life.

Figure 6:
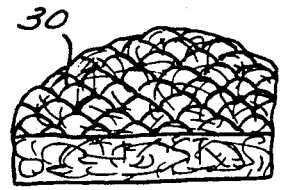
FIG. 6 is a perspective view illustrating structural details of the plant base cover of FIGS. 1 and 2.
Figure 5:
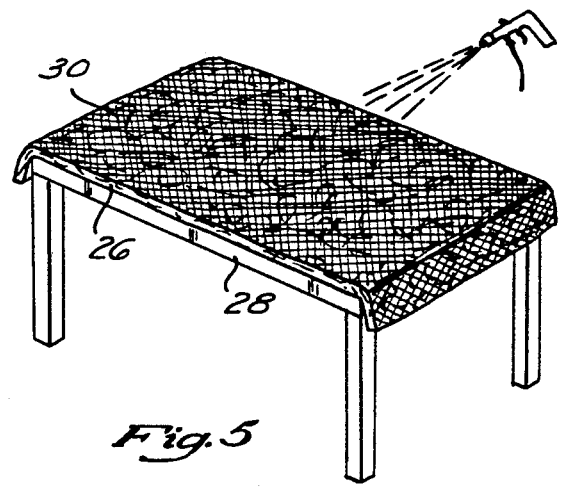
FIG. 5 is a perspective view illustrating the step of spraying the netting of FIG. 4 and the layer of moss of FIG. 3 with an adhesive.

Referring to FIG. 6, the finished plant base cover 18 is formed so that portions 32 of the moss layer 26 project through the netting 30 to provide high structural integrity. After the adhesive has cured and propellants and solvents have evaporated, there is no toxicity to plants or humans and no unpleasant odors, so that the plant base cover 18 is suitable for use on both indoor and outdoor plants.

The finished plant base cover 18 may be cut into desired, preferably standardized sized, shapes, or it may be simply rolled into a compact shape for shipment to a seller or user, who will cut the plant base cover 18 into a desired shape.

The plant base cover 18 is useful to prevent the potting soil 14 from drying out as quickly as if it were uncovered. Therefore, a plant with which the plant base cover 18 is used does not have to be watered as often as a plant whose base and potting soil are uncovered.

Since the moss layer 26 has the netting 30 adhesively bond thereto, small pieces of the moss layer 26 are unlikely to be inadvertently pushed out of the pot 12 during watering of the plant 10, removing the inner pot 12 from the outer pot 15 and other tending to the plant 10, such as cultivation and fertilization of the potting soil 14. Therefore, use of the plant base cover 18 prevents the spillage of the mulch material from the pot 12.

Referring now to a second embodiment of the present invention, FIG. 7 shows a basket liner 50 disposed within a conventionally known hanging plant basket 52. Basket 52 may be formed of any ceramic, plastic, metal or wooden material. Importantly, liner 50 is constructed to have the same configuration as the interior of basket 52. Referring now to FIG. 8, liner 50 generally comprises a layer of decorative material 54 having a layer of netting material 56 adhesively bound thereto. Fabrication of liner 50 preferably includes the step of forming the layer of decorative material 54 by applying a suitable material such as sphagnum moss or Spanish moss to the semi-spherical outer surface 58 of a pre-constructed form 60 as best seen in FIG. 3. Form 60 is taken from the interior portion of basket 52 thus giving liner 50 a configuration which is specifically adapted to be used in conjunction with basket 52. The decorative material is preferably 1"–2" thick and is spread relatively uniformly over the entire outer surface 58. The material is then preferably sprayed with a suitable adhesive as seen in FIG. 10 thus forming layer 54.

Referring now to FIG. 11 the layer of netting material 56 which is preferably a diagonal mesh, is spread over the layer of decorative material 54 and subsequently moderately stretched taut to slightly compress the decorative material 54 between the netting 56 and outer surface 58 of form 60. The netting material 56 and decorative material 54 are then sprayed with a suitable adhesive to bond them together as seen in FIG. 12. The netting 56 and decorative material 54 are then removed from form 60 and inverted thus forming liner 50 wherein the outer surface comprises the layer of decorative material 54 and the interior surface comprises the layer of netting material 56. After the adhesive has been dried, if desired, a suitable colorant may be applied to the layer of decorative material 54 as seen in FIG. 13. Although the method of forming liner 50 has been described with respect to a basket having a generally concave interior configuration, it will be appreciated that liner 50 may be configured so as to be positionable within the interior portions of baskets having alternative configurations. In this regard, a form may be taken from any such basket and liner 50 constructed on the exterior surface thereof in the same manner as previously described.

Although the present invention has been described with reference to two particular embodiments thereof, it will be understood by those skilled in the art that numerous modifications may be made without departing from the scope of the invention. Accordingly, all modifications and equivalents which are properly within the scope of the appended claims ar included in the present invention.

What is claimed is:

1. A method for fabricating a liner for lining an interior portion of a hanging plant basket having a generally concave interior configuration with a decorative material and maintaining a quantity of soil therein, comprising the steps of:

applying decorative material to a generally semi-spherical outer surface of a form, said decorative material being applied to said outer surface in a manner forming a layer thereupon;

a first spraying of adhesive on said layer of decorative material;

applying a layer of netting over said layer of decorative material upon said outer surface;

a second spraying of adhesive on said layer of netting and said layer of decorative material;

removal of said decorative material and said netting from said form; and inverting said decorative material and said netting such that said decorative material defines a semi-spherical outer surface of said liner adapted to directly abut said concave interior portion of said hanging basket and said netting defines a concave, soil retaining surface of said liner.

2. The method of claim 1 further including the step of pulling said layer of netting tightly against said layer of decorative material to cause a portion of said decorative material to penetrate through said netting to enhance the adhesive bonding of said layers of netting and decorative material.

3. The method of claim 1 further including the steps of:

allowing said adhesive to cure; and spraying said decorative material with a colorant.

4. A method for fabricating a liner for lining an interior portion of a hanging plant basket with a decorative material and maintaining a quantity of soil therein, comprising the steps of:

applying decorative material to an outer surface of a pre-constructed form taken from said interior portion of said basket in a manner forming a layer thereupon;

a first spraying of adhesive on said layer of decorative material;

applying a layer of netting over said layer of decorative material upon said outer surface;

a second spraying of adhesive on said layer of netting and said layer of decorative material;

removal of said decorative material and said netting from said form; and inverting said decorative material and said netting such that said decorative material defines an outer surface of said liner adapted to directly abut said interior portion of said hanging plant basket and said netting defines an inner, soil retaining surface of said liner.

* * * * *